Patented Feb. 25, 1936

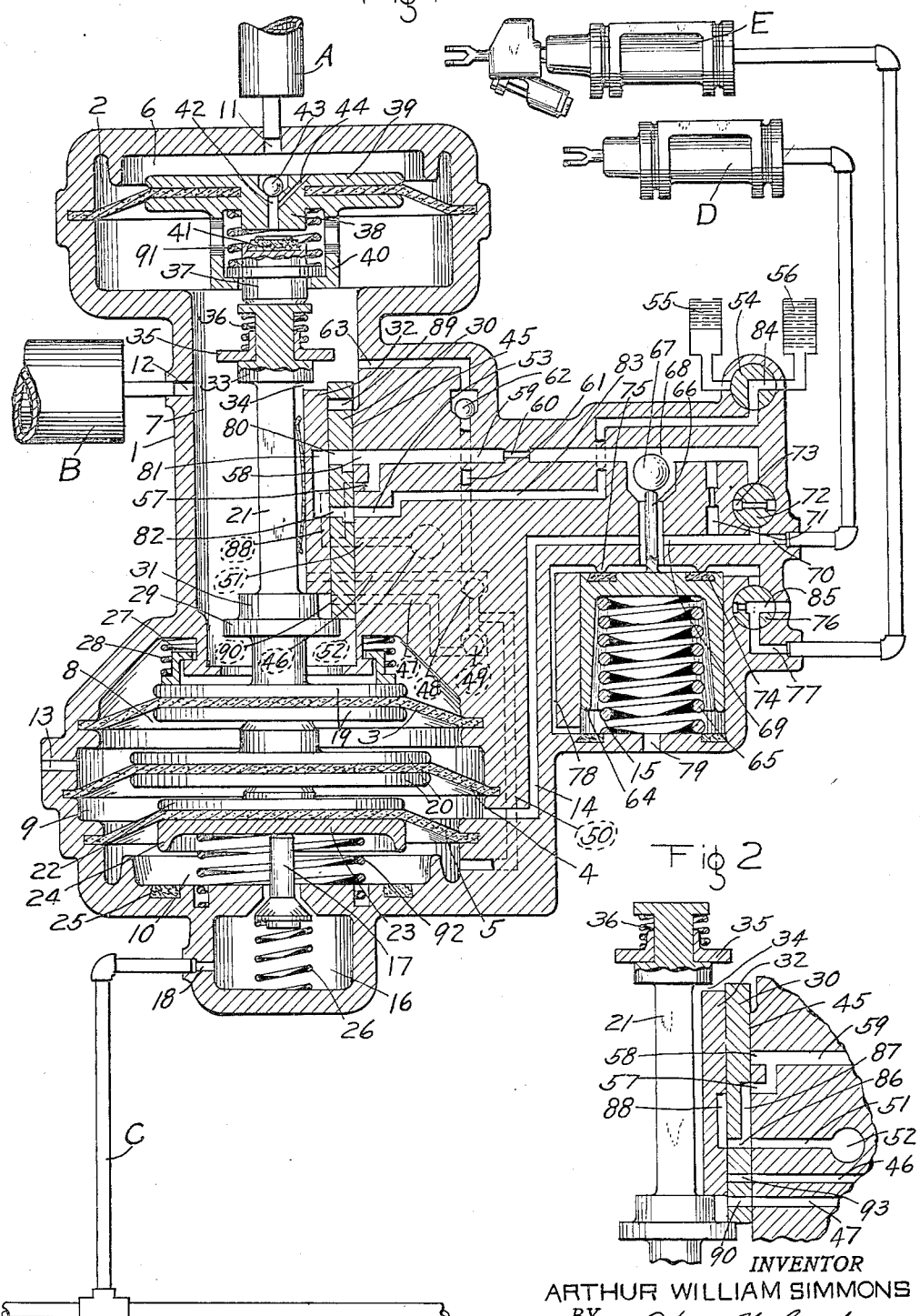

2,032,154

UNITED STATES PATENT OFFICE 2,032,154

FLUID PRESSURE BRAKE

Arthur William Simmons, King's Cross, London, England, assignor to The Westinghouse Air Brake Company, Wilmerding, Pa., a corporation of Pennsylvania Application July 20, 1934, Serial No. 736,171
In Italy December 2, 1933

12 Claims. (Cl. 303—74)

This invention relates to fluid pressure braking apparatus of the kind in which the supply of fluid to and its release from the brake cylinder or cylinders of the apparatus is arranged to be controlled by a distributing valve device in accordance with variations in brake pipe pressure, and has for its object to provide an improved construction of distributing valve device of this character.

The improved valve device comprises valves adapted to control communication between the brake cylinder or cylinders and a source of fluid under pressure or the atmosphere, in order to effect a graduated application or release of the brakes, these valves being operated by a number of movable abutments subject to the pressures obtaining in the brake pipe and brake cylinder and to the pressure in a control chamber in the well known manner, and according to the principal feature of the invention the valve device comprises a single set of co-axially arranged diaphragms subject to the pressures obtaining in the control reservoir, the brake pipe and the brake cylinder, these diaphragms being capable of three distinct ranges of axial movement, the first of which controls the charging of the control reservoir, the second range of movement controlling the graduation of an application or release of the brakes, and the third range of movement establishing communication between the brake cylinder and the source of fluid under pressure or the atmosphere.

According to a further feature of the invention certain of the diaphragms are capable of independent movement in such a manner as to effect the sealing of the control reservoir during an application of the brakes and to limit the maximum brake cylinder pressure obtained upon a predetermined relatively large reduction in brake pipe pressure.

In addition to these functions the movement of the diaphragms may be arranged to effect the usual quick service action upon an initial reduction of brake pipe pressure as well as the control of the recharging of the auxiliary reservoir in accordance with the release of fluid under pressure from the brake cylinder or cylinders when the brake pipe pressure is being increased towards its normal value during the release of the brakes, and it will thus be evident that the invention enables all the functions usually required in braking service to be obtained by a valve device of relatively simple construction and comprising a minimum of separate parts.

The invention is illustrated by way of example in the accompanying drawing, of which Figure 1 is a diagrammatic sectional view of a preferred form of distributing valve device embodying the invention as applied to apparatus comprising light and load brake cylinders;

Figure 2 being a similar view of a portion of the valve of Figure 1 showing in full lines certain ports and cavities which are shown in dotted lines in Figure 1, for the sake of clearness.

Referring now to the drawing, it will be seen that the valve device illustrated comprises a casing 1, subdivided internally by a number of co-axially arranged flexible diaphragms 2, 3, 4 and 5 so as to form a series of chambers or compartments 6, 7, 8, 9 and 10, the uppermost compartment 6, termed the control chamber, being in communication with a control reservoir A, through a passage 11. The compartment 7, termed the auxiliary reservoir chamber, is similarly in communication through a passage 12 with the auxiliary reservoir B, the compartment 8 being in communication with the atmosphere through a port 13. The compartment 9, termed the brake cylinder chamber, communicates through a passage 14 with a quick inshot valve device 15, forming part of the valve mechanism, and the lowermost compartment 10, termed the brake pipe chamber, communicates with a chamber 16 formed below the chamber 10 through a valve 17, the chamber 16 communicating with the brake pipe C of the apparatus through a passage 18.

The diaphragms 3 and 4 are provided with follower or clamping plates 19, 20 respectively, by means of which these diaphragms are secured to a stem 21, the diaphragm 5 being provided with upper and lower follower or clamping plates 22, 23 respectively, the plate 22 being adapted to abut against the lower follower plate 20 of the diaphragm 4. The lower plate 23 of the diaphragm 5 is provided with an annular downwardly extending rib 24 adapted, when the diaphragm 5 is in its lowermost position, to engage with an annular gasket 25 inset in the base of the chamber 10. The valve 17, which is of the poppet type, is provided with a controlling spring 26 tending to move the valve towards its closed position, the valve being moved towards its open position by the engagement of the follower plate 23 of the diaphragm 5 with the upper end of the valve 17.

The upper follower plate 19 of the diaphragm 3 is adapted to engage with a flanged annular stop member 27, arranged, as shown in Figure 1, to be capable of a limited amount of axial movement against the action of a controlling spring 28, the stem 21 being provided with a lower flange 29 adapted to engage with the lower edge of a main slide valve 30 and with a similar flange 31 adapted to engage with the lower edge of a graduating slide valve 32 superposed on the main slide valve 30. The stem 21 is also provided with an upper flange 33 adapted to engage with the upper edge of the graduating valve 32, a relatively small amount of lost motion, as indicated at 34, being provided between the flanges 31 and 33 and the graduating valve 32. The upper edge of the main slide valve 30 is adapted to be engaged by a flange plate 35 mounted on the upper part of the stem 21 so as to be capable of sliding thereon in an axial direction to a limited extent against the action of the controlling spring 36.

The upper end of the stem 21 abuts against the lower end of a valve member 37 capable of a limited amount of axial movement towards or away from a valve seat 38, which is formed in a follower member 39 secured to the diaphragm 2. The valve member 37 is contained in a box or cage 40 serving as a guide and attached to or forming part of the member 39. The upper face of the valve member 37 is provided with a gasket 41 and a central passage 42 formed in the valve seat 38 establishes communication between the control chamber 6 and the auxiliary reservoir chamber 7, a non-return ball valve 43 being provided at the upper end of the passage 42. Restricted communication between the chamber 6 and the passage 42 is also provided by way of a small port 44. The valve seat 45 of the main slide valve 30 is provided with ports 46 and 47 communicating through non-return ball valves 48, 49 with a passage 50 formed in the valve casing and leading to the brake pipe chamber 10. The valve seat 45 is also provided with a port 51 leading to an accelerating bulb 52, a port 53 leading through a rotary plug valve 54 to labyrinth exhaust outlets 55, 56, and with two adjacent ports 57, and 58 communicating with a passage 59 containing a restriction 60 and leading to the quick inshot valve 15. The port 46 in the valve seat 45 also communicates with a passage 61 containing a non-return ball valve 62 and terminating in a port 63 opening into the auxiliary reservoir chamber 7.

The quick inshot valve 15 is of well known construction, comprising a piston 64 and provided with a controlling spring 65, the piston 64 being provided with a stem 66 adapted to engage with a ball valve 67 located in a chamber 68 communicating with the passage 59. A chamber 69 underneath the ball valve 67 and above the piston 64 communicates with the passage 14 and with a passage 70 leading to the light load brake cylinder D. Communication between the chamber 68 and the passage 70 is effected through a restricted port 71 and through a rotary plug cock 72 containing a restricted passage 73.

The upper face of the piston 64 is provided with an annular gasket 74 adapted to engage with an annular seat rib 75, the annular space above the piston 64 on the outside of the seat rib 75 communicating through a rotary plug cock 76 and a passage 77 with the load brake cylinder E, this space being also in communication through a passage 78 with the underside of the piston 64 which is in open communication with the atmosphere through a port 79.

The operation of the apparatus is as follows:

When the apparatus is being initially charged with fluid under pressure, fluid from the brake pipe C enters the chamber 16 by way of the passage 18, and the valve 17 being in its open position fluid from the chamber 16 flows to the chamber 10 underneath the diaphragm 5.

From the chamber 10 fluid flows by way of the passage 50 past the ball valve 49 to the port 47 into the auxiliary reservoir chamber 7 and thence to the auxiliary reservoir B through the passage 12. Fluid also flows from the passage 50 past the ball valve 48 through the passage 61 and past the ball valve 62 to the auxiliary reservoir chamber 7 by way of the port 63. From the auxiliary reservoir chamber 7 fluid under pressure flows through the port 42 which is uncovered by the valve gasket 41 to the control reservoir chamber 6 past the ball valve 43 and through the restricted port 44, the control reservoir A being charged at the same time through the passage 11.

During the supply of fluid to the auxiliary and control reservoirs and to the chambers 6 and 7 as above described, the several diaphragms will occupy the position shown in Fig. 1, so as to maintain the valve 17 open so long as the rate of supply of fluid to the chamber 16 from the brake pipe is insufficient to cause pressure to build up within the chamber 10 underneath the diaphragm 5 at a greater rate than pressure is built up in the control chamber 6 above the diaphragm 2, the downward pressure exerted upon the diaphragm 2 being balanced by the upward pressure exerted on the diaphragm 5. In the event, however, of fluid being supplied to the chamber 16 from the brake pipe at a greater rate the pressure in the brake pipe chamber 10 will exceed that in the control chamber 6 and the diaphragms will move upwards compressing the controlling spring 28 of the stop member 27, so as to permit the valve 17 to close under the action of its spring 26. When this occurs, the supply of fluid from the chamber 16 to the chamber 10 is interrupted until the pressure in the chamber 10 has been reduced by a flow of fluid to the auxiliary reservoir chamber 7 and the pressure in the control chamber 6 has been increased by the flow of fluid thereto through the passage 42, whereupon the diaphragm being again balanced the valve 17 will be reopened so as to permit the supply of fluid from the chamber 16 to the chamber 10 and thence to the auxiliary reservoir to continue.

The controlling spring 28 above referred to is so proportioned that the valve 17 will be permitted to close when the pressure in the brake pipe chamber 10 and in the auxiliary reservoir chamber 7 exceeds the control reservoir pressure in the chamber 6 by approximately two to three pounds per square inch, so that the rate of charging of the auxiliary reservoir B is controlled by the rate of charging of the control reservoir A in such a manner that the pressures in these two reservoirs cannot differ by more than two to three pounds per square inch.

During the charging of the system with fluid under pressure the main slide valve 30 and the auxiliary slide valve 32 remain substantially in the positions shown in Figures 1 and 2, and retain these positions when the system has been fully charged to the normal standard pressure so that the apparatus is in its full release position.

Under these conditions the light load brake cylinder D will be in communication with the atmosphere by way of passage 70, chambers 69 and 68, passage 59, port 58 in the seat 45 of the main slide valve 30, a port 80 in the main slide valve, a cavity 81 in the graduating valve 32, a port 82 in the main slide valve 30, the port 53, and passage 83 and port 84 in the rotary plug cock 54 and exhaust outlet 56.

When the apparatus is set for load braking the rotary plug cock 54 is adjusted to its load position in which the port 84 communicates with the exhaust outlet 55.

Under these conditions the rotary plug cocks 72 and 76 are also adjusted to load braking positions so that the load brake cylinder E is in communication with the atmosphere by way of passage 77, port 85 in the rotary plug cock 76, passage 78 and exhaust port 79. The accelerating bulb 52 is in communication with the atmosphere by way of port 51, cavity 87 in the main slide valve 30, port 57 and passage 59.

When it is required to effect a service application of the brakes the brake pipe pressure is reduced in the usual manner effecting a corresponding reduction of pressure in the chamber 16 and in the brake pipe chamber 10. The set of diaphragms, together with their valve stem 21, will thus move downwards under the action of the control reservoir pressure in the control chamber 6 and it will be observed that since the auxiliary reservoir pressure in the chamber 7 acts in opposite directions upon the diaphragms 2 and 3 while the chambers 8 and 9 are at atmospheric pressure, the pressure acting upon the diaphragms for effecting their downward movement is the difference between the control reservoir pressure in the chamber 6 and the brake pipe pressure in the chamber 10. The initial downward movement of the diaphragms causes the lost motion between the flange 33 of the stem 21 and the graduating valve 32 to be taken up, thereby maintaining the valve 17 fully open and the continued downward movement of the stem 21 moves the graduating slide valve 32 to a position in which a cavity 88 establishes communication between the ports 51 and 46. During this movement the flanged plate 35 engages with the upper end of the main slide valve 30 so that the spring 36 is compressed to an extent sufficient to permit the cavity 88 to register with ports 86 and 93 in the main slide valve 30 which in this position of the main slide valve register with the ports 51 and 46, respectively. Fluid is thereupon vented from the brake pipe C by way of passage 18, chambers 16 and 10, passage 50 and port 46, port 93, cavity 88, ports 86 and 51, to the accelerating bulb 52, thereby effecting a local reduction in brake pipe pressure so as to cause the usual quick service action.

The downward movement of the graduating valve 32 uncovers a port 89 in the main slide valve 30, and covers a port 90 in the main slide valve 30 registering with the port 47 in the release position of the slide valve. In this position of the main and graduating slide valves 30 and 32, it will be evident that communication between the brake pipe chamber 10 and the auxiliary reservoir chamber 7 is cut off by the non-return valve 62 and the closure of the port 90, so that fluid from the auxiliary reservoir chamber 7 cannot flow back to the brake pipe C. Communication established by cavity 81 between passage 59 and passage 83 leading to the exhaust outlet 55 or 56 is cut off at the port 89 and the continued downward movement of the stem 21 causes the flanged plate 35 to move the main slide valve 30, the compression of the spring 36 overcoming the friction between the slide valve 30 and the valve seat 45, so that the port 89 no longer registers with the port 58, and the cavity 87 establishes communication between the port 51 leading to the accelerating bulb 52 and the port 46 leading to the brake pipe, with the result that fluid under pressure continues to be vented from the brake pipe into the accelerating bulb 52 so as to complete the quick service action.

The final portion of the downward movement of the main valve 30 causes the port 89 to register with the port 58 so that fluid is supplied from the auxiliary reservoir B to the brake cylinder passage 59 by way of the auxiliary reservoir chamber 7 and ports 89 and 58, the fluid flowing from the passage 59 through the restricted port 66, chamber 68, past the open ball valve 67, chamber 69 and passage 70 to the light load brake cylinder D, fluid being also supplied from the chamber 68 through the restricted port 71 to the passage 70.

As soon as the pressure in the light load brake cylinder D has been built up to a value determined by the controlling spring 65 of the quick inshot valve 15, the piston 64 will be moved downwards thereby permitting the valve 67 to close so that the further supply of fluid under pressure to the light load brake cylinder is effected through the restricted passage 71 only.

It will be understood that when the apparatus is set for load braking the downward movement of the piston 64 of the quick inshot valve 15 will effect the supply of fluid under pressure from the chamber 69 to the load brake cylinder E by way of the port 85 in the rotary plug cock 76 and the passage 77.

The supply of fluid to the brake cylinder or cylinders from the auxiliary reservoir chamber 7 causes the pressure within this chamber to be reduced, the pressure in the brake cylinder chamber 9 being correspondingly increased by the flow of fluid from the brake cylinder or cylinders to the chamber 9 through the passage 14.

The reduction of pressure in the auxiliary reservoir chamber 7 will cause the diaphragm 2 to move downwards relative to the stem 21 under the action of the pressure in the control chamber 6, with the result that the valve seat 38 will be moved into engagement with the gasket 41, compressing a control spring 91 interposed between the follower plate 39 and the valve member 37, so as to close communication between the control chamber 6 and the auxiliary reservoir chamber 7.

The increase of pressure in the brake cylinder chamber 9 will exert an upward pressure on the diaphragm 4 which will cooperate with the upward pressure exerted upon the diaphragm 5 by the brake pipe pressure in the chamber 10 to effect an upward movement of the stem 21 acting in opposition to the downward pressure exerted upon the stem by the pressure in the control chamber 6 acting upon the diaphragm 2, and as soon as the brake cylinder pressure in the chamber 9 has attained a value corresponding to the reduced brake pipe pressure in the chamber 10 the stem 21 will be moved upwards carrying with it the graduating valve 32 to close the port 89 and thereby cut off the further supply of fluid from the auxiliary reservoir chamber 7 to the brake cylinder or cylinders, the apparatus thus being in its lap position.

Further successive reductions in brake pipe pressure will cause the graduating slide valve 32 to be again moved downward so as to uncover the port 89 and thereby effect further successive increases in brake cylinder pressure in the well known manner.

As soon as a predetermined maximum brake cylinder pressure is thus obtained any further reduction in brake pipe pressure will cause the diaphragm 5 to move downwards out of engagement with the lower follower plate 20 of the diaphragm 4, this downward movement of the diaphragm being effected against the action of a controlling spring 92 so that the upward pressure acting on the stem 21 is under these conditions that due only to the brake cylinder pressure obtaining in the chamber 9, this pressure being balanced by the control reservoir pressure in the control chamber 6.

A further reduction in brake pipe pressure or a complete reduction in this pressure to atmospheric pressure will cause the diaphragm 5 to move downwards until the rib 24 on the follower plate 23 engages with the gasket 25, thereby cutting off communication between the chamber 16 and the passage 50.

During an application of the brakes as above described it will be evident that the pressure obtained in the brake cylinder or cylinders will be quite independent of the stroke of the brake pistons in these cylinders or of whether fluid under pressure is supplied to the light brake cylinder only or to both the light and load brake cylinders, since the action of the valve device as regards effecting the supply of fluid under pressure to the brake cylinders is dependent upon the brake cylinder pressure obtaining in the chamber 9, and on the reduction effected in the brake pipe pressure.

Furthermore, while the brakes are being applied any leakage of fluid from the brake cylinder or cylinders will by causing a reduction in the pressure obtaining in the brake cylinder chamber 9 cause the piston stem 21 to be moved downwards to cause the graduating valve 32 to uncover the port 89 and thereby effect the supply of fluid under pressure from the auxiliary reservoir chamber 7 until the brake cylinder pressure is restored to its proper value.

The reduction in the auxiliary reservoir pressure due to such supply of fluid to the brake cylinder will permit fluid to be supplied from the brake pipe C by way of chamber 10, passage 50, past the ball valve 48, passage 61, past the ball valve 62 and through port 63 to the auxiliary reservoir chamber 7, thereby restoring the auxiliary reservoir pressure to the pressure obtaining in the brake pipe.

When it is desired to effect a graduated release of the brakes the brake pipe pressure is increased to the desired extent towards its normal value in the usual manner, thereby effecting a corresponding increase in the pressure in the chamber 10; the diaphragms and their stem 21 will consequently be moved upwards to the position shown in Figure 1 and fluid under pressure will be thereupon released from the light load brake cylinder D by way of passage 59, cavity 81, passage 83, and the exhaust outlet 55 or 56 as above described, and as soon as the brake cylinder pressure obtaining in the chamber 9 has been thus reduced to an extent dependent upon the increase in the brake pipe pressure obtaining in the chamber 10 the diaphragms will move the stem 21 downwards to cause the graduating valve 32 to cover the port 80 and thereby cut off the further exhaust of fluid from the light load brake cylinder.

As the brake pipe pressure is increased in successive steps the action above described will be repeated so as to effect corresponding successive reductions in brake cylinder pressure, while each successive increase in brake pipe pressure causes a corresponding increase in the pressure in the auxiliary reservoir by the flow of fluid through the passages 50, 61, past the ball valves 48 and 62, fluid being also supplied from the passage 50 to the auxiliary reservoir past the ball valve 49 by way of ports 47 and 90, so long as the graduating slide valve 32 is in the position shown during the time that fluid is being vented from the brake cylinder to the atmosphere.

It will be observed, however, that during the releasing operation in the event of the auxiliary reservoir pressure being higher than the brake pipe pressure, the flow of fluid from the auxiliary reservoir chamber 7 to the brake pipe chamber 10 is prevented by the action of the ball valves 62, 48 and 49.

During the release of the brakes as above described, so long as the rate of rise in the brake pipe pressure is equal to or less than the rate of fall in the brake cylinder pressure, the rise of pressure in the auxiliary reservoir will correspond to the rise in brake pipe pressure. If, however, the rate of increase of the brake pipe pressure is greater than the rate of decrease of the brake cylinder pressure, the pressure in the brake cylinder chamber 9 will cause the diaphragms to move upwards from the position shown in Figure 1, the stop member 27 being moved upwards compressing the spring 28, thereby permitting the valve 17 to be moved to or towards its closed position. As a result, the flow of fluid from the brake pipe C through the chamber 16 to the auxiliary reservoir will be cut off or reduced and the pressure in the chamber 10 will in these circumstances be substantially the auxiliary reservoir pressure. The diaphragms under these conditions will be controlled by the auxiliary reservoir pressure obtaining in the chamber 10 until the brake cylinder pressure has been reduced to a required extent, so that the rate of recharge of the auxiliary reservoir B is determined by the rate of decrease in the brake cylinder pressure, regardless of the pressure obtaining in the brake pipe C when the rate of increase of this latter pressure is excessive.

It will be observed that during this further upward movement of the diaphragm the slide valves 30 and 32 are moved upward, and on downward movement of the stem 21 the slide valves remain in this position, this being permitted by the lost motion indicated at 34 between the stem 31 and the graduating slide valve 32. The passages in the slide valve 30 are provided with extended portions overlapping the ports in the valve seat 45, so that the passages in the slide valve will remain in alignment with the ports in the valve seat after this upward movement.

When the pressure in the light load brake cylinder D has been reduced to a relatively low value during the graduated release of the brakes as above described, the piston 64 of the quick inshot valve 15 will return to the position shown in Figure 1, whereupon the load brake cylinder E will be vented to the atmosphere in the usual manner by way of passage 77, port 85 in the rotary plug cock 76, passage 78 and exhaust port 79, and as soon as the pressure in the auxiliary reservoir B has been restored to a value which is only less than the control reservoir pressure by approximately two pounds per square inch, the diaphragm 2 will be moved upwards under the action of the controlling spring 91 thereby causing the valve seat 38 to move out of engagement with the gasket 41 so as to establish communication between the control chamber 6 and the auxiliary reservoir chamber 7, by way of the port 44. The pressures obtaining in the chambers 6 and 7 will thus be equalized, and the diaphragms will accordingly move to their full release position shown in Figure 1, in which fluid is finally vented from the light load brake cylinder D to atmosphere, independent of any further increase in brake pipe pressure.

In the event of the control chamber and the auxiliary reservoir chamber becoming for any reason charged to a pressure above the normal pressure, the pressure in these chambers can be reduced by reducing the brake pipe pressure down to the normal value at a relatively slow rate, the fluid from the auxiliary reservoir B flowing to the brake pipe C by way of ports 99 and 47, past ball valve 49, and through passage 50 and chambers 10 and 16.

The excess pressure in the control reservoir A will similarly be reduced by flow of fluid from the control chamber 6 to the auxiliary reservoir chamber 7 by way of port 44, it being understood that the rate of reduction of brake pipe pressure to the normal value is sufficiently slow to prevent the ball valve 49 from becoming closed or the diaphragm 2 moving downwards to close communication between the chambers 6 and 7.

It will be understood that the restricted passage 73 in the rotary plug cock 72 is provided for increasing the flow of fluid to the brake cylinders when both the light and load brake cylinders are in operation, the two labyrinth exhaust outlets 55 and 56 being provided for enabling the exhaust of fluid to take place at a suitable rate according to whether one or both brake cylinders is or are operative.

The invention is evidently not limited to the particular construction above described and illustrated by way of example, which may be modified in various respects without exceeding the scope of the invention.

Having now described my invention, what I claim as new and desire to secure by Letters Patent, is:

1. In a fluid pressure brake, the combination with a brake pipe, brake cylinder, and a source of fluid under pressure, of a control reservoir and a distributing valve device comprising valve means for controlling communication between the brake cylinder and said source of fluid under pressure or the atmosphere, a plurality of co-axially disposed movable abutments subject to the pressures obtaining in the brake pipe, the brake cylinder, and said control reservoir for operating said valve means, said abutments being capable of three distinct ranges of movement, the first of which controls the charging of the control reservoir, the second range of movement controlling the graduation of the application and release of the brakes, and the third range of movement establishing communication between the brake cylinder and the source of fluid under pressure or the atmosphere.

2. In a fluid pressure brake, the combination with a brake pipe, brake cylinder, and a source of fluid under pressure, of a control reservoir and a distributing valve device comprising valve means for controlling communication between the brake cylinder and said source of fluid under pressure or the atmosphere, a plurality of co-axially disposed movable abutments subject to the pressures obtaining in the brake pipe, the brake cylinder, and said control reservoir for operating said valve means, said abutments being capable of three distinct ranges of movement, the first of which controls the charging of the control reservoir, the second range of movement controlling the graduation of the application and release of the brakes, and the third range of movement establishing communication between the brake cylinder and the source of fluid under pressure or the atmosphere, one of said abutments being capable of independent movement such that communication through which said control reservoir is charged is cut off when an application of the brakes is effected.

3. In a fluid pressure brake, the combination with a brake pipe, brake cylinder, and a source of fluid under pressure, of a control reservoir and a distributing valve device comprising valve means for controlling communication between the brake cylinder and said source of fluid under pressure or the atmosphere, a plurality of co-axially disposed movable abutments subject to the pressures obtaining in the brake pipe, the brake cylinder, and said control reservoir for operating said valve means, said abutments being capable of three distinct ranges of movement, the first of which controls the charging of the control reservoir, the second range of movement controlling the graduation of the application and release of the brakes, and the third range of movement establishing communication between the brake cylinder and the source of fluid under pressure or the atmosphere, one of said abutments being capable of independent movement to cause said valve device to operate to limit the maximum brake cylinder pressure obtained, when the brake pipe pressure is reduced below a chosen value.

4. In a fluid pressure brake, the combination with a brake pipe, brake cylinder, and auxiliary reservoir, of a control reservoir, a brake controlling valve device comprising valve means for controlling the supply and release of fluid under pressure to and from the brake cylinder, a plurality of movable abutments subject to the pressures obtaining in the brake pipe, brake cylinder, and said control reservoir for operating said valve means, and a valve controlled by one of said abutments for controlling communication through which the auxiliary reservoir is charged with fluid under pressure from the brake pipe, said valve operating abutment being subject to the opposing pressures of the control reservoir and the brake pipe.

5. In a fluid pressure brake, the combination with a brake pipe, brake cylinder, and auxiliary reservoir, of a control reservoir, a brake controlling valve device comprising valve means for controlling the supply and release of fluid under pressure to and from the brake cylinder, a plurality of movable abutments subject to the pressures obtaining in the brake pipe, brake cylinder, and said control reservoir for operating said valve means, and a valve controlled by one of said abutments for controlling communication through which the auxiliary reservoir is charged from the brake pipe, said valve operating abutment being movable to control said communication without actuating said valve means to supply fluid under pressure to the brake cylinder.

6. In a fluid pressure brake, the combination with a brake pipe, brake cylinder, and auxiliary reservoir, of a control reservoir, a brake controlling valve device comprising valve means for controlling the supply and release of fluid under pressure to and from the brake cylinder, a plurality of movable abutments subject to the pressures obtaining in the brake pipe, brake cylinder, and said control reservoir for operating said valve means, a valve controlled by one of said abutments for controlling communication through which said control reservoir is charged from the brake pipe, a non-return valve for preventing back flow through said communication, and a restricted communication permitting flow of fluid between the control reservoir and the brake pipe in both directions.

7. In a fluid pressure brake, the combination with a brake pipe, brake cylinder, an auxiliary reservoir, and a control reservoir, of a brake controlling valve device comprising valve means for controlling the supply and release of fluid under pressure to and from the brake cylinder, and a plurality of movable abutments for operating said valve means and including an abutment subject to the opposing pressures of the fluid in the control reservoir and the auxiliary reservoir, an abutment subject to the pressure of the fluid in the auxiliary reservoir, an abutment subject to the pressure of the fluid in the brake cylinder, and an abutment subject to the opposing pressures of the fluid in the brake cylinder and in the brake pipe.

8. In a fluid pressure brake, the combination with a brake pipe, a brake cylinder, an auxiliary reservoir, and a control reservoir, of a brake controlling valve device comprising valve means for controlling the supply and release of fluid under pressure to and from the brake cylinder, and a plurality of movable abutments for operating said valve means, said abutments including an abutment subject to the pressure of the fluid in the control reservoir and urged thereby to move the valve means in one direction, an abutment subject to the pressure of the fluid in the brake cylinder, and an abutment subject to the pressure of the fluid in the brake pipe, each of said last-named abutments being urged by the fluid pressure operative thereon in a direction to move the valve means in a direction opposite to that in which the valve means is urged by the first named abutment, one of said abutments being capable of independent movement such that the communication through which said control reservoir is charged is cut off when an application of the brakes is effected.

9. In a fluid pressure brake, the combination with a brake pipe, a brake cylinder, an auxiliary reservoir, and a control reservoir, of a brake controlling valve device comprising valve means for controlling the supply and release of fluid under pressure to and from the brake cylinder, and a plurality of movable abutments for operating said valve means, said abutments including an abutment subject to the pressure of the fluid in the control reservoir and urged thereby to move the valve means in one direction, an abutment subject to the pressure of the fluid in the brake cylinder, and an abutment subject to the pressure of the fluid in the brake pipe, each of said last-named abutments being urged by the fluid pressure operative thereon in a direction to move the valve means in a direction opposite to that in which the valve means is urged by the first named abutment, the abutment subject to the pressure of the fluid in the control reservoir, and the abutment subject to the pressure of the fluid in the brake pipe being movable relative to the valve means.

10. In a fluid pressure brake, the combination with a brake pipe, a brake cylinder, an auxiliary reservoir, and a control reservoir, of a brake controlling valve device comprising valve means for controlling the supply and release of fluid under pressure to and from the brake cylinder, and a plurality of movable abutments for operating said valve means, said abutments including an abutment subject to the pressure of the fluid in the control reservoir and urged thereby to move the valve means in one direction, an abutment subject to the pressure of the fluid in the brake cylinder, and an abutment subject to the pressure of the fluid in the brake pipe, each of said last-named abutments being urged by the fluid pressure operative thereon in a direction to move the valve means in a direction opposite to that in which the valve means is urged by the first named abutment, the abutment subject to the pressure of the fluid in the brake pipe being movable relative to said valve means, and valve means controlled by the abutment subject to the pressure of the fluid in the brake pipe and controlling a communication through which fluid under pressure is supplied from the brake pipe to the auxiliary reservoir.

11. In a fluid pressure brake, the combination with a brake pipe, a brake cylinder, an auxiliary reservoir, and a control reservoir, of a brake controlling valve device comprising valve means for controlling the supply and release of fluid under pressure to and from the brake cylinder, and a plurality of movable abutments for operating said valve means, one of said abutments being subject to the pressure of the fluid in the control reservoir, another of said abutments being subject to the pressure of the fluid in the brake cylinder, and another of said abutments being subject to the pressure of the fluid in the brake pipe, and valve means controlling a communication between the control reservoir and the auxiliary reservoir, said valve means comprising a pair of relatively movable elements, one of said elements being controlled by a member subject to the pressure of the fluid in the control reservoir, the other of said elements being controlled by a member subject to the pressure of fluid in the brake cylinder.

12. In a fluid pressure brake, the combination with a brake pipe, a brake cylinder, an auxiliary reservoir, and a control reservoir, of a brake controlling valve device comprising valve means for controlling the supply and release of fluid under pressure to and from the brake cylinder, and a plurality of movable abutments for operating said valve means, one of said abutments being subject to the pressure of the fluid in the control reservoir, another of said abutments being subject to the pressure of the fluid in the brake cylinder, and another of said abutments being subject to the pressure of the fluid in the brake pipe, and valve means controlling the supply of fluid from the brake pipe to the auxiliary reservoir, said valve means being urged to the open position by the force created by the pressure of the fluid in the control reservoir operating on the first abutment, this force being opposed by the force created by the pressure of the fluid in the brake cylinder operating on the second abutment and the pressure of the fluid in the brake pipe operating on the third abutment.

ARTHUR WILLIAM SIMMONS.